(12) United States Patent   (10) Patent No.: US 7,703,571 B2
Riepold et al.              (45) Date of Patent:    Apr. 27, 2010

(54) DETERMINATION OF THE ABSOLUTE POSITION OF A STEERING SYSTEM THROUGH A LINEAR SENSOR ON THE RACK

(75) Inventors: Thomas Riepold, Frechen (DE); Salvatore Oliveri, Filsen (DE)

(73) Assignee: Tedrive Holding BV (NL)

( * ) Notice: Subject to any disclaimer, the term of this patent is extended or adjusted under 35 U.S.C. 154(b) by 0 days.

(21) Appl. No.: 11/777,060

(22) Filed: Jul. 12, 2007

(65) Prior Publication Data

US 2008/0011539 A1    Jan. 17, 2008

(30) Foreign Application Priority Data

Jul. 13, 2006   (DE) ............ 10 2006 032 685
Aug. 22, 2006   (DE) ............ 10 2006 039 600
Jun. 8, 2007    (DE) ............ 10 2007 027 039

(51) Int. Cl.
    B62D 5/04        (2006.01)
(52) U.S. Cl. ............... 180/446; 180/404; 180/443
(58) Field of Classification Search ............... 180/446, 180/443, 404
    See application file for complete search history.

(56) References Cited

U.S. PATENT DOCUMENTS

| 4,649,340 | A  | * | 3/1987  | Zabler ............... 324/207.18 |
| 4,774,465 | A  | * | 9/1988  | Nilius ............... 324/207.18 |
| 4,924,696 | A  | * | 5/1990  | Schroeder et al. ....... 73/117.02 |
| 6,810,985 | B1 | * | 11/2004 | Budaker et al. ......... 180/444 |
| 7,187,153 | B2 | * | 3/2007  | Imagawa et al. ........ 318/638 |
| 7,242,182 | B2 | * | 7/2007  | Finkler et al. ........ 324/207.24 |
| 2004/0143379 | A1 | * | 7/2004  | Borroni-Bird et al. ..... 701/36 |
| 2004/0222035 | A1 | * | 11/2004 | Yoneda et al. .......... 180/443 |

* cited by examiner

*Primary Examiner*—Lesley Morris
*Assistant Examiner*—Tashiana Adams
(74) *Attorney, Agent, or Firm*—Cantor Colburn LLP

(57) ABSTRACT

The invention relates to a steering system of a motor vehicle with a rack, which is connected on the end side with steerable wheels and which pivots said wheels through a lateral movement. The steering system has a position sensor which continuously determines the position of the rack and emits corresponding position signals.

8 Claims, 2 Drawing Sheets

DETERMINATION OF THE ABSOLUTE POSITION OF A STEERING SYSTEM THROUGH A LINEAR SENSOR ON THE RACK

FIELD

The present invention relates to a steering system of a motor vehicle with a rack, which on the end side is connected with steerable wheels and pivots said wheels through a lateral movement.

BACKGROUND

With a conventional steering system steerable wheels are steered by a driver via an actuation unit, more preferably through twisting a steering wheel. The rotating of the steering wheel causes a displacement of a rack which in turn pivots the wheels. In power steerings the steering movement of the driver is supported through an additional electric motor. Here, the steering support is generally performed through characteristic-controlled or regulated systems where the steering support is applied as a function of the vehicle speed.

In addition, steering systems are known where no mechanical connection exists between the steerable wheels and the steering wheel (steer by wire). Here, the wheels are pivoted as a function of the angle of rotation of the steering wheel with the help of appropriate motors.

To determine the position of the steering wheel and the steered wheels, rotary angle-of-rotation sensors are generally employed, in the steering train mostly on the steering column, on the steering pinion direct or on the input shaft connected with the latter. These can be designed to determine the absolute steering angle either over the entire steering angle range or only over 360°. In the latter case, the angle-of-rotation sensor can determine the absolute steering angle only in conjunction with a centre finding algorithm.

These steering angle sensors can be designed as both so-called multi-turn sensors, which measure the absolute steering angle over more than one turn from lock to lock or as single-turn sensors which can trace the absolute steering angle only over one steering revolution. In addition, incremental angle sensors are also known.

In an electric power steering the steering angle can also be determined via the position sensor of the electric motor which is directly or indirectly tied to the steering column with a certain ratio. Based on the ratio between steering column and electric motor, the angular signal of said position sensor which is absolute on its own is likewise not an absolute one relative to the steering column.

When using an angle sensor which merely measures absolutely over one steering wheel revolution, only an approximate position determination is required to determine the centre, while with incrementally acting angle sensors or measurement via the position sensor of the motor, far greater accuracy of the position determination is required. This can take place either via evaluation of the wheel rotational speeds or via evaluation of the steering moment and the steering angular velocity. In both cases however it requires a certain time or travelling distance in order to find a sufficiently accurate centre position by means of these centre finding algorithms, as is required depending on the utilisation purpose of the angular signals. Following a system restart this restricts the scope of performance of the comfort and safety systems dependent on the steering angle for a certain time which impairs their availability.

In addition, electric power steering systems generally utilise a separate torque sensor assigned to the steering system for measuring the steering moment applied to the steering wheel by the driver. This torque sensor mostly serves exclusively for measuring the torque, but can also be combined with an angle-of-rotation sensor.

BRIEF DESCRIPTION

The object of the present invention consists in creating a steering system which determines the position of the steered wheels, the electric motor and, with steering systems with a mechanical connection between steering wheel and the steered wheels, the position of the steering wheel with the help of a linear sensor on the rack without using an otherwise usual angle-of-rotation sensor.

According to the invention the object is solved through a steering system of a motor vehicle with a rack, which on the end side is connected with steerable wheels and which pivots said wheels through a lateral movement of the rack, with a position sensor which continuously determines the position of the rack and emits corresponding position signals.

The invention is based on the idea that the steering angle, which directly correlates with the position of the rack, can also be determined in an easier manner directly via said rack.

According to the invention a sensor and a receiver component can be provided each of which can be arranged on the moveable rack and a fixed component, for example the rack housing. More preferably so-called PLCD sensor systems (permanent linear contactless displacement) where a magnetic element is displaced and the magnetic field characteristics redundantly sensed via a dense system are suitable. The path of the magnetic element can then be passed on as control signal. Accordingly, the magnetic element is arranged on the rack and moves with the rack. The receiver is arranged as coil or arrangement of several coils fixed in the housing. The housing is preferably manufactured of aluminium or a similar material. As an option, the evaluation unit can be integrated in the sensor.

Alternatively, a position sensor designed according to the short circuit ring principle can be used. A short circuit ring or several short circuit rings is/are arranged on the rack and the coil or the coils fixed in the housing. Optionally the evaluation unit can be integrated in the sensor.

These sensors are of simpler construction and can be manufactured and installed more cost effectively than the known sensors arranged in the steering gear and/or on the steering column. With the help of the steering system according to the invention, sensing of the steering moment without own steering moment sensor of the known types is possible through evaluation of the signals from an angle sensor arranged in the steering train and the position of the rack relative to the steering housing. Through evaluating the two position signals and the known rigidity between the sensors, the steering moment can be determined. To this end, a rotationally elastic element can be optionally used between both sensors or not.

According to the invention, a use of the position of the rack as parameterised measuring and control quantity for influencing the operating behaviour of the steering system is possible. This can for instance be a position-dependent parameterisation of the active return.

Advantageously the position of the rack can also be used as parameterised measuring and control quantity for use in dynamic drive systems such as ABS, EPS. Thus, the invention continues to utilise that modern vehicles are usually equipped with dynamic drive systems anyway which continuously determine data for driver support. By linking for example slip control, brake and drive stability systems (ABS, ASC, DSC, ESP etc.) one succeeds in increasing the active safety and the driving comfort and relieve the driver in this way, they help the driver to safely control his vehicle even in critical situations. Such systems become active only when for example the tyres are at risk of loosing the adhesion, i.e. before the wheels spin, skid or block. Wheel sensors monitor for instance how fast the wheels rotate during the braking operation. If a wheel tends to block the braking pressure on the respective wheel brake cylinder is automatically reduced so far until the wheel again runs under normal slip. With the drive slip control, sensors ensure that the drive force during acceleration is transmitted with minimum slip. Regardless of the position of the accelerator pedal, only so much engine power is permitted as is possible in the current driving situation without spinning wheels. By sensing the wheel speeds through sensors this system detects if the wheels grip securely. If the driven wheels tend to spin the control intervenes in the engine management and reduces the torque regardless of the current accelerator pedal position.

With the dynamic stability control, additional sensors determine further driving states in order to increase the driving safety during abrupt evasive manoeuvres or sudden danger situations. An expansion of the ABS increases the driving stability particularly when braking in curves. The control system controls the brake pressures below the ABS control threshold through different amounts of braking pressures on the left and right for stabilising counteracting moments. In addition, dynamic brake management systems are known which support the braking of the driver or for example accelerate the braking operation.

Sensors determine the yaw rate which indicates how quickly the vehicle turns around its normal axis, the lateral acceleration, as dimension for curve radius and speed, the steering angle which indicates the desired direction and the braking pressure exerted by the driver via the pedal and the rotational speed of the individual wheels. The abovementioned embodiments must only be understood as examples, dynamic drive data are also determined and utilised through additional systems.

By linking-up with such a dynamic drive system which continuously determines measuring and control quantities of the vehicle it is possible according to the invention that a computer calculates the torque applied by a driver to a steering train from the determined measuring and control quantities and the position signals of the sensor of the rack.

If the movement of the rack is supported by an electric motor without position sensor rigidly coupled to the rack the computer according to the invention can calculate the determination of the position of the electric motor from a mechanical ratio between the electric motor and the rack as well as the position signals and generate corresponding motor position signals. The position sensor in the electric motor can then be abandoned.

However, if a position sensor is present in the electric motor the computer according to the invention is able to calculate the torque applied by the driver to the steering train from the determined measuring and control quantities of the dynamic drive system, the position signals of the sensor of the rack and the motor position signals. A brushless electric motor is suitable for this purpose for example.

BRIEF DESCRIPTION OF THE FIGURES

The invention is explained in more detail by means of the following Figures. These should only be understood as examples, the invention is not to be restricted to these. It shows.

DETAILED DESCRIPTION

Figure 1:
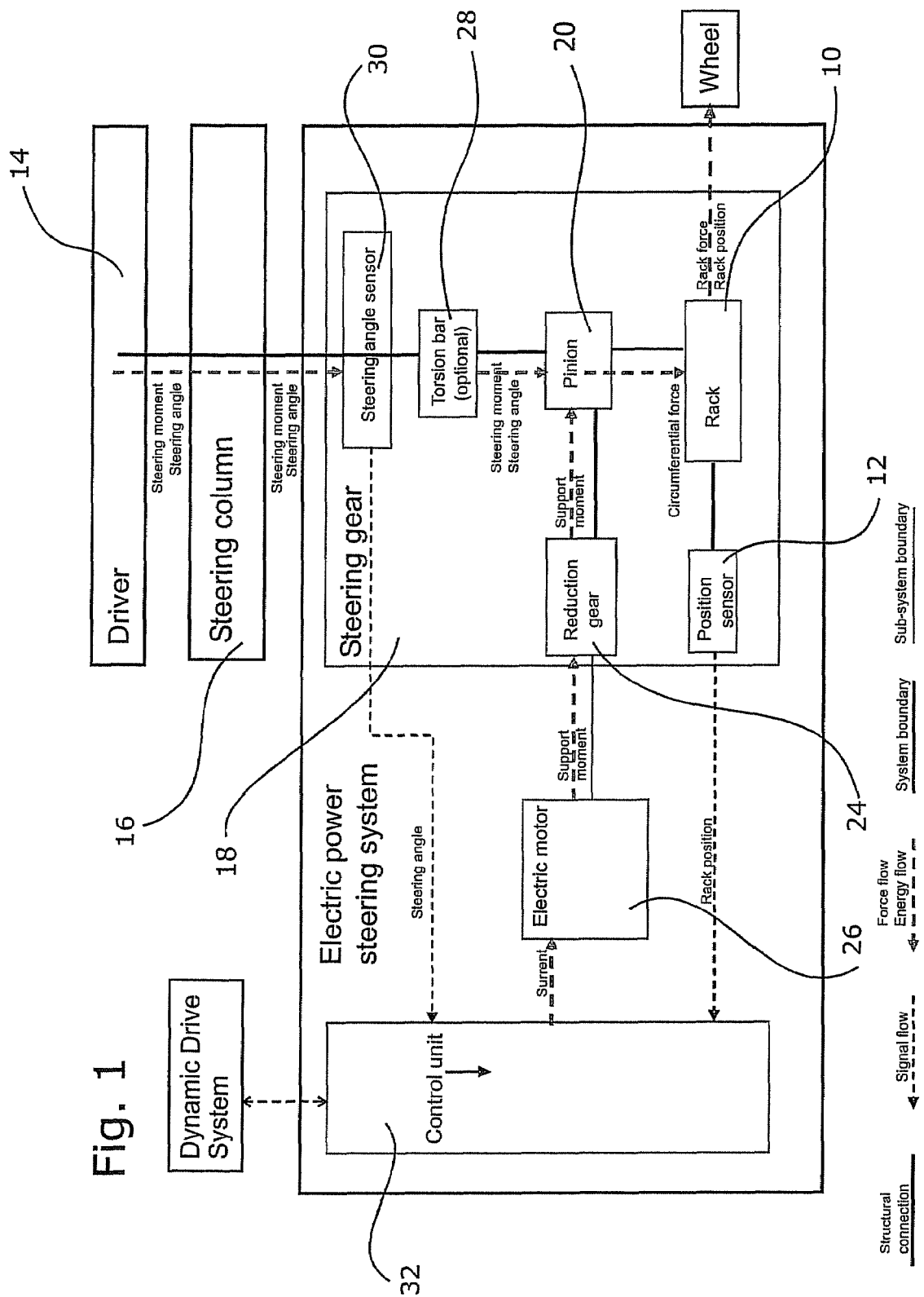
FIG. 1: a schematic diagram for an electric power steering without own torque sensor but with a sensor for determining the position of the rack and a steering angle sensor in the steering gear.

Each of the two figures shows a schematic diagram for utilisation of a steering system according to the invention. As can be seen from the respective associated legend, structural connections, signal flow or force flow or energy flow are possible between the components shown. In addition, system boundaries and sub-system boundaries are represented through different strength lines. In both systems a position sensor 12, which for example can be formed through a PLCD sensor system, is present on a rack. The position sensor 12 determines the position of the rack 10 relative to a fixed component, preferably a rack housing.

In both steering systems it is shown that a driver 14 applies a steering moment to a steering gear 18 via a steering column 16. Optionally the steering column 16 can have a steering angle sensor 30 according to the state of the art (compare FIG. 2).

In both cases the steering gear 18 has a pinion 20 via which the steering moment is transmitted to the rack 10. The steering moment is supported through a reduction gear 24 which in turn is driven by an electric motor 26. Optionally the steering gear 18 can also have a torsion bar 28. Via the torsion bar it is possible to determine a steering moment acting on the steering gear 18.

According to FIG. 1 a steering angle sensor 30 is provided in the steering gear 18 which determines the steering angle. The determined steering angle is transmitted to a control unit 32 which likewise receives a rack position determined by the position sensor 12. The electric motor 26 is controlled via the control unit 32. Thus the control unit is able to determine the optimum support moment for the reduction gear 24 from the steering angle and the rack position. Usually data from the steering system are also utilised as part of a dynamic drive system for systems such as for instance ABS, ASC, DSC, ESP etc.

Figure 2:
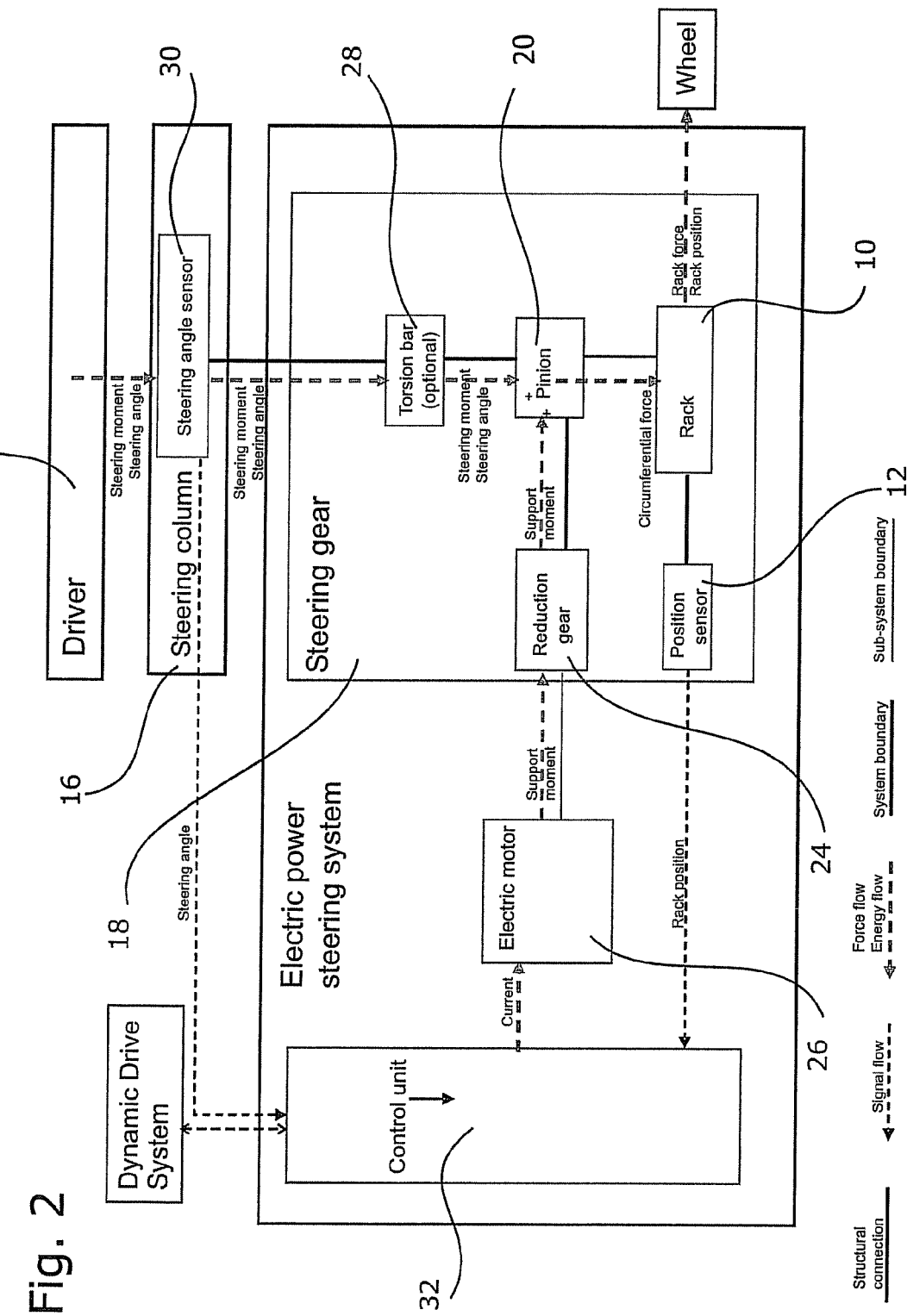
FIG. 2: a schematic diagram for an electric power steering without own torque sensor but with a sensor for determining the position of the rack and a steering angle sensor in the steering column.

In the embodiment according to FIG. 2 the steering angle sensor 30, as already explained above, is not arranged in the steering gear 18 but in the steering column 16. The determined steering angle is likewise transmitted to the control unit 32.

Through the position sensor 12 on the rack 10 and the steering angle sensor 30, either arranged in the steering gear 18 or on the steering column, it is possible to determine the steering moment applied by the driver 14. To this end, either the known rigidity between the steering angle sensor 30 and the position sensor 12 or optionally the torsion bar 28 can be used for calculation.

The two figures explain only one possible exemplary application for the steering system according to the invention. In determining the steering moment it can be sufficient for various applications to merely determine the position of the rack 10 via the position sensor 12.

The invention is not restricted to the described exemplary embodiment but rather comprises all embodiments having the same effect.

The invention claimed is:

1. A steering system of a motor vehicle comprising:
   a rack, which on the end side is connected with steerable wheels and which pivots said wheels through a lateral movement,
   a position sensor configured to continuously determines position of the rack and emit corresponding position signals;
   a steering angle sensor configured to determine steering angle and emit steering angle signals;
   a control unit configured to receive the position signals and the steering angle signals, wherein the control unit is further configured to determine steering moment via evaluation of the position signals, the steering angle signals, and a known rigidity between the position sensor and the steering angle sensor,
   wherein the position sensor is embodied according to a short circuit ring principle, wherein the short circuit ring principle involves at least one short circuit ring and a coil, the at least one ring being arranged on the rack and the coil being fixed in a rack housing.

2. The steering system according to claim 1, wherein a sensor and a receiver component are provided which are arranged on the movable rack and a fixed component.

3. The steering system according to claim 2, wherein a magnetic element is provided which moves with the rack and the magnetic field characteristics of which are utilised to determine the position of the rack.

4. The steering system according claim 1, including a dynamic drive system which continuously determines the measuring and control quantities of the vehicle, wherein the control unit calculates a torque applied to a steering train by a driver from the determined measuring and control quantities and the position signals of the position sensor of the rack.

5. The steering system according to claim 1, wherein the steering system has an electric motor without position sensor rigidly coupled to the rack to support the movement of the rack and the determination of the position of the electric motor from a ratio between the electric motor and the rack as well as the position signals of the linear sensor are calculated and a corresponding motor position signal for controlling the electric motor is generated.

6. The steering system according to claim 1, wherein the steering system has an electric motor rigidly coupled to the rack and generating motor position signals, with position sensor for supporting the movement of the rack, wherein the control unit calculates the torque applied to the steering train by the driver from the determined measuring and control quantities of the dynamic drive system, the position signals of the position sensor of the rack and motor position signals.

7. The steering system according to claim 6, wherein a brushless electric motor is used.

8. The steering system according to claim 1, wherein said steering angle sensor is arranged in steering gear or on a steering column.

* * * * *